Figure 1:
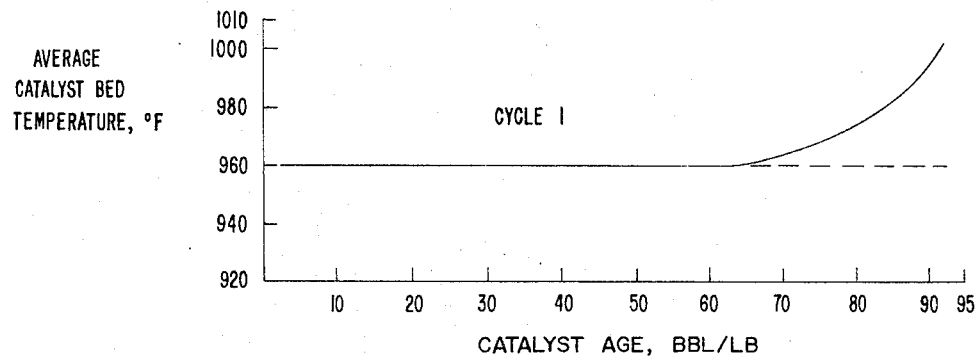

Oct. 11, 1966  R. H. COE ETAL  3,278,419
PLATINUM GROUP HYDROFORMING CATALYST REACTIVATION PROCESS
Filed April 28, 1965

INVENTORS:
RICHARD H. COE
HERBERT E. RANDLETT
BY: *[signature]*
THEIR ATTORNEY

United States Patent Office 3,278,419
Patented Oct. 11, 1966

3,278,419
PLATINUM GROUP HYDROFORMING CATALYST REACTIVATION PROCESS
Richard H. Coe and Herbert E. Randlett, Houston, Tex., assignors to Shell Oil Company, New York, N.Y., a corporation of Delaware
Filed Apr. 28, 1965, Ser. No. 451,381
9 Claims. (Cl. 208—140)

This invention relates to platinum catalysts, and more particularly to the treatment of deactivated platinum catalysts to restore the activity and selectivity thereof.

Platinum catalysts are used extensively in catalytic reforming processes, which have become widely used commercially in the past ten years or so. The platinum catalyst is comprised of platinum, usually supported on a suitable base such as alumina, and a small amount of halogen such as chlorine and/or fluorine to improve hydrocracking and isomerization activity. The catalyst will generally contain from about 0.1 to 2.0% wt. platinum and from about 0.1 to about 3% by weight halogen.

The catalytic reforming operation is generally carried out at a pressure in the range from 50 to 1000 p.s.i.g., usually 200 to 700 p.s.i.g., and a temperature in the range of 750° to 1050° F., usually 850° to 1000° F., and a liquid hourly space velocity of 0.5 to about 5. The reforming reaction is conducted in the presence of hydrogen, which serves to repress the formation of carbonaceous deposits on the catalysts, the amount of hydrogen being from about 3 to about 20 moles of hydrogen per mole of hydrocarbon feed.

The feed to the catalytic reforming reactor can be straight-run naphtha, cracked naphtha and the like, or mixtures thereof. It is generally desired to subject the naphtha to a hydrotreatment to remove sulfur, nitrogen, arsenic and other compounds, and, in the case of cracked naphtha, to saturate olefins contained therein. While the feed may be a light, heavy or full-boiling range naphtha, it is preferred that the naphtha boil in the range from 160° to 400° F. The feed is preheated to reaction temperature, either alone or in admixture with recycle hydrogen gas, and passed to the reaction zone. Normally, two or more fixed bed reactors, preferably three or four, are used in series with reheat provided between reactors.

The reforming reaction involves many reactions such as the dehydrogenation of naphthenes to aromatics, isomerization of straight-chain paraffins to form branched-chain paraffins, isomerization of cyclic compounds, such as methylcyclopentane to cyclohexane, dehydrocyclization, dealkylation and hydrocracking.

During the course of the catalytic reforming reaction, catalyst activity gradually declines owing to a buildup of carbonaceous deposits on the catalyst and/or a depletion of halogen from the catalyst. Eventually it becomes necessary to regenerate the catalyst by subjecting the catalyst to an oxidizing atmosphere to remove carbonaceous deposits by burning. Halogen can be added to the catalyst during the regeneration procedure or by the addition of a volatile decomposable halogen compound to the feed during operation. Generally, however, carbon burn and/or halogen replenishment fails to restore the catalyst to initial activity and selectivity, or if so, only temporarily, and activity and selectivity decrease at an increased rate during subsequent use of the catalyst. This decreased activity, even with regenerated and halogenated catalyst, is attributed to agglomeration of platinum crystallites. Consequently, it has been the practice to process the "spent" platinum catalyst for the extraction, separation and recovery of the platinum which is then used for fresh catalyst. This is, of course, an expensive operation because of the platinum recovery charges and the cost of manufacturing the catalyst.

It has been proposed to reduce the size of the agglomerated platinum by subjecting the catalyst, after being burned substantially free of carbon, with an oxygen-containing gas under certain conditions of time, temperature and oxygen partial pressure. This procedure, generally referred to as an "air soak," is often only partially effective to favorably alter the size of the platinum crystallite.

This invention provides an improved method for restoring the activity and selectivity of "spent" platinum group metal catalyst in a fixed, moving or fluid bed catalytic reforming process. The method comprises the combined steps of (1) pretreating the catalyst during regular operation, (2) regeneration and (3) reactivation. More particularly, the reactivation method of the invention comprises the sequential steps of (1) pretreating the catalyst under normal operating conditions, and preferably during such normal operations, with chlorine, (2) contacting the chlorine-treated deactivated carbonized catalyst with an oxygen-containing gas to burn off carbonaceous deposits thereon, and (3) reactivation of the chlorine-treated and decarbonized catalyst by "air soaking" as described more fully hereinbelow. This treatment restores the chlorine content of the catalyst, effects a redispersion of the crystallites of catalytic metal (platinum or palladium) and thus restores the catalyst's activity.

CHLORINE PRETREATING STEP

The chlorine pretreating step, or prechloriding of the catalyst, is performed by injection of chlorine into the liquid feed to the catalytic reforming process during the last few (usually about two) days of process operation just preceding shutdown of the process for reactivation of the catalyst. While chlorine gas may be used for this purpose, it is preferred to employ a normally liquid chlorine-containing compound which, upon exposure to the reaction conditions of the reforming process, will be decomposed to form hydrogen chloride. By this means, more precise metering of the chlorine into the process is possible. Chlorine-containing compounds which are especially suitable for this purpose are $C_{1-3}$ chlorinated hydrocarbons such as trichloroethylene and ethylene dichloride, which have atmospheric boiling points within the boiling range of the hydrocarbon feed.

In order to control the amount of chloride which is adsorbed onto the catalyst, it has been found necessary to inject water into the process throughout the prechloriding step. More particularly, it has been found that the ratio of chlorine to water ($Cl/H_2O$) in the process feed at a given operating temperature determines the equilibrium concentration of chlorine adsorbed on the catalyst. Thus, the $Cl/H_2O$ ratio is adjusted to obtain a given degree of chlorine adsorption. The required $Cl/H_2O$ ratio varies directly with both temperature and the desired of adsorption. For example, to obtain an equilibrium chlorine adsorption of 0.3% by weight, basis catalyst, at 750° F., a $Cl/H_2O$ ratio of about 0.00055 (mole ratio of 0.000275) is needed. But if the operating temperature is raised to 850° F., a $Cl/H_2O$ ratio of about 0.00105 (mole ratio of 0.00053) is needed. Likewise at a temperature of 850° F., if it is desired to effect 0.5% by weight chlorine adsorption, a still higher $Cl/H_2O$ ratio is required—about 0.0044 (mole ratio of 0.0022). The proper ratio of chlorine to water will therefore range from about 0.0002 to about 0.050 mole chlorine/mole $H_2O$, depending upon (1) the average catalyst bed temperature during prechloriding and (2) the desired level of chlorine adsorption on the catalyst.

At least up to the corrosion tolerance limits of the process equipment, it is preferred to employ relatively large chlorine addition rates in order to lessen the time during which chlorine (and water) must be added to the process feed to obtain the desired degree of chlorine content on the catalyst.

The length of time during which chloride injection must be carried out is dependent upon the hydrocarbon feed rate, catalyst inventory, chloride content of the catalyst prior to prechloriding and the desired catalyst chloride level. While it will always be desired to bring the catalyst chloride level to at least 0.3% by weight of the catalyst, it is possible to bring the chloride level to as high as 1.1%, which seems to be the equilibrium concentration of chlorine on the catalyst in the reducing environment of normal operating conditions. However, it is preferred to prechloride the catalyst to a level of 0.8–1.1% by weight, with the high end of the range being more effective.

CARBON BURNOFF STEP

While the chlorine pretreating step is a necessary step of the process of the invention, it is insufficient by itself to restore the acidity of the catalyst with a satisfactory balance of cracking and aromatic forming activity.

At the end of the prechloriding step of the process, the reforming operation is discontinued by cutting out the hydrocarbon feed, including chlorine. In order to carry out the carbon-burning step, the still hot ($>700°$ F.) reactor(s) is purged with nitrogen or other inert gas to reduce hydocarbon concentrations therein and also, as frequently may be required, to reduce the temperature of the reactor bed.

The temperature of the reactor bed should not be lowered to less than about 700° F. prior to carbon burning. On the other hand, the carbon burning should not be carried out beyond a temperature of about 1050° F., above which the physical characteristics of the catalyst support may be deleteriously affected. Thus, the step of burning the carbon from the catalyst is carried out at between 700 and 1050° F., and preferably between 700 and 900° F.

The actual burning of the carbon from the catalyst is carried out by introducing into the hot ($\geq 700°$ F.) catalyst bed an inert gas containing only a small amount of oxygen. Most economical for this purpose is nitrogen gas containing a small amount of air. The temperature of the bed during the burning step is regulated by adjusting the amount of oxygen in the inert gas. The rate of burning can, of course, be changed by varying the amount of total gas passed through the reactor. In commercial practice, the inert gas can conveniently be passed through the reactor(s) by means of a compressor which, during normal operation, is used to recycle hydrogen gas to the process. Oxygen content of the inlet gas will ordinarily not exceed about 1.0% volume within the above-mentioned temperature limits.

Though substantial but incomplete burning of the carbon may in some instances be sufficient or expedient, it is usually preferred to burn essentially all the burnable carbon from the catalyst. The attainment of essentially complete removal of all the burnable carbon from the catalyst is quite easily determined by measurement of the $CO_2$ content of the effluent gas from the reactor outlets. When essentially no $CO_2$ remains in the effluent, removal of the carbonaceous deposits is completed.

The amount of oxygen in the inert gas during the carbon burnoff will ordinarily be on the order of about 0.5% by weight. However, in order to prepare for the reactivation step, described below, which requires a considerably higher amount of oxygen, it will ordinarily be preferred to increase the amount of oxygen slowly stepwise during the last part of the burnoff period. The reason for stepwise increase of the oxygen is, of course, to keep the catalyst bed temperature below the maximum allowable 1050° F. and preferably to make a gradual transition from the preferred 700–900° F. burnoff temperature to the higher (900–1000° F.) preferred reactivation temperature range, which is discussed immediately below.

REACTIVATION STEP

Upon the completion of burning off the carbonaceous deposits from the catalyst, the thusly chlorided and decarbonized catalyst is reactivated by means of a high-temperature "air soak," i.e., by maintaining the catalyst at a relatively high temperature (900–1000° F.) in the presence of higher amounts of oxygen for an extended period.

The transition from the carbon-burning step to the reactivation is accomplished by slowly raising the amount of oxygen in the inert gas which is continuously passed through the reactor(s) toward the end of the carbon burnoff step. As in the carbon-burning step, control of the bed temperature is achieved by regulating the amount of oxygen in the inert gas reactor purge. The reactivation of the catalyst is complete when it has been subjected to the full air high-temperature "soak" for a period of eight hours.

The effectiveness of the reactivation step, during which redispersion of the platinum takes place, depends upon the interactions among the chloride, the air and also water content of the air with temperature. That is, these are the factors which, in effect, determine the final concentration of chlorine in the oxidizing environment of the regeneration. While the chlorine is the principal active reagent for redispersing the platinum, it has been found that the presence of water in the regeneration gas greatly increases the effectiveness of the platinum redispersion.

Thus, though it is preferred that the regeneration or reactivation air contain some water, the amount must be carefully limited to avoid excessive loss of chloride during the air soak. For this reason, it is preferred that the gas used in the "air soak" contain at least 100 p.p.m. water (mole basis) but no more than about 1000 p.p.m. water (mole basis), a level of about 300 to 750 p.p.m. being particularly preferred and 500 p.p.m. being optimum. The foregoing preferred limits on water content of the regeneration gas are essentially independent of the chloride level on the catalyst.

The invention will better be understood by reference to the drawing, which consists of two figures which illustrate graphically the regenerative effectiveness of the invention as compared to mere carbon-burnoff regeneration, and by reference to the examples which follow:

Example I

A commercial reforming catalyst was deactivated after extensive use in reforming a hydrotreated naphtha. Total catalyst life was about 92 barrels of feed per pound of catalyst. As indicated by FIGURE 1 (Cycle 1) of the drawing, the catalyst had become deactivated to an extent that the average catalyst bed temperature required to produce 98.0 Research octane number liquid product had risen from 960° F. to about 1000° F. during the last 18 barrels per pound of the run. (The fresh catalyst also required a temperature of 960° F. to produce 98.0 Research octane number liquid product.)

Operating conditions during the cycle were as follows:

Feed Composition, percent vol.:
    Paraffins _____ 45
    Naphthenes _____ 40
    Aromatics _____ 15
Feed ASTM 50% Point, ° F. _____ >245
Liquid hourly space velocity _____ 1.7
Reactor outlet pressure, p.s.i.g. _____ 400
Reformate Research O.N. _____ 98.0

Composition of the fresh catalyst was 0.75% wt. platinum, 0.3% wt. chlorine, 0.4% wt. fluorine on an alumina carrier. At a catalyst age of about 92 barrels/ pound, the chlorine was depleted to about 0.05% wt.

The reforming unit was then shut down and the catalyst was "regenerated" by carbon-burning alone.

The carbon-burning operation was carried out by circulating nitrogen containing small amounts of oxygen over the catalyst beds. In particular, the burning off of the carbon was initiated with nitrogen gas containing 0–0.3 mole percent $O_2$ at 750° F. for a period of about 3 hours. The amount of oxygen was then raised gradually to about 3.0 mole percent $O_2$ and carbon-burning continued for 26 hours at a reactor inlet temperature of 950° F. Maximum "hot spot" temperature within the reactors was 1000° F. During this time an estimated 2.9% wt. carbon was burned from the catalyst. The analysis of the regenerated catalyst was as follows:

| | Percent wt. |
|---|---|
| Chloride | 0.05 |
| Fluoride | 0.4 |
| Sulfur | 0.03 |
| Carbon | 0.16 |
| Arsenic | <0.001 |

Figure 2:
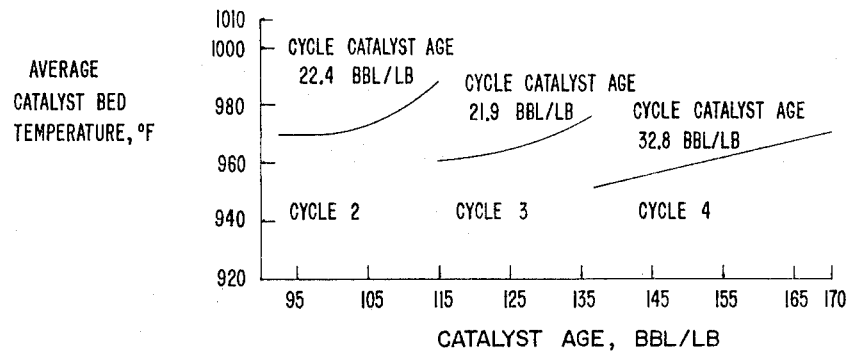

Upon resuming operation of the process, basis same operating conditions as in the initial run, it was found that the average catalyst bed temperature to produce 98.0 R.O.N. reformate had dropped from 1000° F. to only 970° F. However, at the end of only about 22 additional barrels/pound catalyst age (total 114 bbls./lb.), the required average catalyst bed temperature had risen to 987° F. (See Cycle 2 of FIGURE 2 of the drawing.)

*Example II*

During Cycle 2 as described above in Example I, chlorine (as trichloroethylene) was added to the reformer feed about 49 hours before reaching a catalyst age of 115 barrels/pound. The mole ratio of $Cl_2$ to $H_2O$ during this prechloriding step varied from about 0.0002 to about 0.0006 (average 0.0003). At the end of the prechloriding step when the normal processing was discontinued, it was found that 0.46% wt. chlorine had been added to the catalyst, bringing the total chloride content to about 0.51% wt.

Upon completion of the prechloriding step, feed was discontinued and the reactors purged with nitrogen preparatory to burning off the carbonaceous deposits from the catalyst. Carbon-burning was begun by introducing air into the purge gas ($O_2$ concentration 0.2–0.3 mole percent). The burn-off temperature rose from an initial temperature of about 750° F. to about 950° F. at the end of about 15 hours. After 19 hours, the $O_2$ concentration of the inert gas was raised to 2 mole percent and burning was continued at about 950° F. average temperature for 11 hours. At this time the $O_2$ content of the purge gas was raised to that of pure air, thus beginning the air soak step of the regeneration process, which was carried out for eight hours at temperatures between 930 and 980° F., the average being about 950° F. Approximately 3.0% wt. carbon had been burned from the catalyst.

Upon resuming operation of the reforming process (Cycle 3, FIGURE 2), basis same operating conditions as in the initial run, it was found that the average catalyst bed temperature to produce 98.0 R.O.N. reformate had dropped from 985° F. to 962° F. However, unlike the run following carbon burn-off alone (Cycle 2), the average catalyst bed temperature rose only to about 975° F. in 22 bbl./lb. additional catalyst age, as compared to 987° F. at the end of Cycle 2.

*Example III*

During normal operating Cycle 3, chlorine (as trichloroethylene) addition to the reformer feed was commenced about 48 hours before a catalyst age of 170 barrels per pound. The mole ratio of $Cl_2$ to $H_2O$ during this prechloriding step was at least above 0.0002 and averaged about 0.00065. As in the previous prechloriding cycle, water was added to the feed by addition to the hydrocarbon side of the product condensers and was thus added to the feed by means of the recycle gas.

Chlorine addition was continued until the chlorine content of the catalyst was 0.5% wt., at which time hydrocarbon feed to the reformer was discontinued and the reactors purged with nitrogen in preparation for the carbon burn-off step.

Carbon burnoff was commenced by introducing air into the purge gas (0.5% vol. $O_2$) for a period of nine hours, during which the average temperature in the reactors was about 750° F. Additional air was then introduced into the purge gas (equivalent to 2.0% vol. $O_2$) and the burn-off was continued for 10 hours at the higher temperature of about 950° F., at which time the burn-off of carbon was essentially complete as indicated by the fact that the carbon-burning rate was only 0.0005 pound/hour/pound of catalyst.

The high-temperature "air soak" was initiated by raising the $O_2$ concentration to that of full air (20% vol.) during which the catalyst bed temperature was maintained at about 950° F. for an additional period of nine hours. Approximately 3.5% wt. carbon had been burned from the catalyst.

Upon resuming operation of the reforming process (Cycle 4, FIGURE 2), basis the same operating conditions as in the previous cycles, it was found that the average catalyst bed temperature to produce 98.0 R.O.N reformate had dropped from 976° F. to 952° F. Moreover, after operation of the regenerated catalyst for an additional 33 barrels of feed per pound of catalyst (total 170), the required average catalyst bed temperature had risen to only 970° F., as compared to 987° F. at the end of Cycle 2.

*Example IV*

To determine the effect of water in the gas used in "air soaking" of used catalysts from which the carbon had been removed by burning, the following series of experiments was conducted:

Four spent commercial platinum reforming catalysts ($Pt/Al_2O_3$/halogen) were impregnated with dilute HCl at room temperature. The chloride contents of the dried catalyst samples were as follows:

| Sample Designation | A | B | C | D |
|---|---|---|---|---|
| Cloride content, percent wt | 0.15 | 0.30 | 0.52 | 0.85 |

Hydrogen chemisorption measurements on the chlorided as well as the untreated samples showed no change in available platinum surface.

These catalysts were then subjected to a high-temperature "air soak" at 950° F. for eight hours using relatively dry air (about 50 p.p.m. mole $H_2O$). The tests were then repeated on catalysts C and D to determine the effect of using moist air on platinum redispersal. In this latter series of tests, a measured portion of inlet air was passed through a constant-temperature humidifier and the water-rich air stream was blended with preheated dry air to obtain the desired water concentration. The moist gas was then passed downwardly through a bed of the catalyst. Operating conditions of the "air soak" were temperature 950° F., pressure 100 p.s.i.g., gas flow 18.6 s.c.f.h., period of treatment 8 hours. The results were as follows:

TABLE I.—EFFECT OF WATER ON PLATINUM REDISPERSION DURING REGENERATION

| Catalyst Designation | Chloride Content of Catalyst, Percent wt. | Water Content of Inert Gas, p.p.m. mole | $H_2$ Chemisorption [1] |
|---|---|---|---|
| A | 0.15 | ca. 50 | 17 |
| B | 0.30 | ca. 50 | 22 |
| C | 0.52 | ca. 50 | 38 |
| D | 0.85 | ca. 50 | 63 |
| C | 0.52 | ca. 500 | 63 |
| D | 0.85 | ca. 500 | 79 |

[1] $H_2$ chemisorption proportional to available platinum surface area.

The above data show that greater than about 100 p.p.m. mole H₂O greatly enhances the degree of platinum redispersion at all chloride levels, thereby increasing the available area of platinum surfaces, ergo catalytic activity as well.

While the foregoing examples are directed to reformer operation during which no chlorine (except possibly a very small amount incidentally contained in the recycle gas) was added to the catalyst except in accordance with the process of the invention, it will be recognized that it is possible to add chlorine either continuously or intermittently to the feed during regular operation even before significant deactivation of the catalyst has taken place. For example 1–5 p.p.m. or even up to about 10 p.p.m. by weight chlorine is frequently added throughout such reforming runs. Alternatively, equivalent amounts of chlorine can be added intermittently during the regular operation. Within the context of the invention, either of these types of chlorine addition are considered to be normal operation. Thus the chlorine addition rates specified in the prechloriding step of the process as claimed are inclusive of all chlorine which at that time is being introduced into the reformer feed from whatever source and exclusive of all chlorine which may have been added prior to the prechloriding step as claimed.

We claim as our invention:

1. In a process for the catalytic reforming of hydrocarbons in the presence of hydrogen over a bed of platinum group metal catalyst, a method for regenerating the activity of said catalyst comprising the sequential steps:
   (1) during the normal operation of the process when the catalyst is at least partially deactivated by the accumulation of carbonaceous deposits and by the agglomeration of the platinum group metal into large crystallites of low activity, introducing chlorine and water into the hydrocarbon feed until the chlorine content of the catalyst is between about 0.3% by weight and equilibrium at the then operating conditions, the rate of chlorine addition being between about 20 p.p.m. and 200 p.p.m. by weight of the hydrocarbon feed and the mole ratio of $Cl_2$ to $H_2O$ being between about 0.0002 to 0.050, after which operation of the process is discontinued;
   (2) removing at least a portion of the carbonaceous deposits from the catalyst by burning the deposits in the presence of an inert gas containing oxygen, the average temperature of the catalyst bed being maintained at below 1050° F.; and
   (3) maintaining the catalyst bed at a temperature of 900–1000° F. in the presence of an inert gas containing at least about 20% by volume oxygen for a period of at least eight hours.

2. In a process for the catalytic reforming of hydrocarbons in the presence of hydrogen over a bed of platinum group metal catalyst, a method for regenerating the activity of said catalyst comprising the sequential steps:
   (1) during the normal operation of the process when the catalyst is at least partially deactivated by the accumulation of carbonaceous deposits and by the agglomeration of the platinum group metal into large crystallites of low activity, introducing chlorine and water into the hydrocarbon feed until the chlorine content of the catalyst is between about 0.3% by weight and equilibrium at the then operating conditions, the rate of chlorine addition being between about 20 p.p.m. and 200 p.p.m. by weight of the hydrocarbon feed and the mole ratio of $Cl_2$ to $H_2O$ being between about 0.0002 to 0.050, after which operation of the process is discontinued;
   (2) removing at least a portion of the carbonaceous deposits from the catalyst by burning the deposits in the presence of an inert gas containing oxygen, the average temperature of the catalyst bed being maintained between 700 and 900° F.; and
   (3) maintaining the catalyst bed at a temperature of 900–1000° F. in the presence of an inert gas containing at least about 20% by volume oxygen for a period of at least eight hours.

3. In a process for the catalytic reforming of hydrocarbons in the presence of hydrogen over a bed of platinum group metal catalyst, a method for regenerating the activity of said catalyst comprising the sequential steps:
   (1) during the normal operation of the process when the catalyst is at least partially deactivated by the accumulation of carbonaceous deposits and by the agglomeration of the platinum group metal into large crystallites of low activity, introducing chlorine and water into the hydrocarbon feed until the chlorine content of the catalyst is between about 0.3 and 1.1% by weight, the rate of chlorine addition being between about 20 p.p.m. and 200 p.p.m. by weight of the hydrocarbon feed and the mole ratio of $Cl_2$ to $H_2O$ being between about 0.0002 to 0.050, after which operation the process is discontinued;
   (2) removing at least a portion of the carbonaceous deposits from the catalyst by burning the deposits in the presence of an inert gas containing oxygen, the average temperature of the catalyst bed being maintained between 700 and 900° F.; and
   (3) maintaining the catalyst bed at a temperature of 900–1000° F. in the presence of an inert gas containing at least about 20% by volume oxygen for a period of at least eight hours.

4. In a process for the catalytic reforming of hydrocarbons in the presence of hydrogen over a bed of platinum group metal catalyst, a method for regenerating the activity of said catalyst comprising the sequential steps:
   (1) during the normal operation of the process when the catalyst is at least partially deactivated by the accumulation of carbonaceous deposits and by the agglomeration of the platinum group metal into large crystallites of low activity, introducing chlorine and water into the hydrocarbon feed until the chlorine content of the catalyst is between about 0.3% by weight and equilibrium at the then operating conditions, the rate of chlorine addition being between about 20 p.p.m. and 200 p.p.m. by weight of the hydrocarbon feed and the mole ratio of $Cl_2$ to $H_2O$ being between about 0.0002 to 0.050, after which operation of the process is discontinued;
   (2) removing at least a portion of the carbonaceous deposits from the catalyst by burning the deposits in the presence of an inert gas containing oxygen, the average temperature of the catalyst bed being maintained at below 1050° F.; and
   (3) maintaining the catalyst bed at a temperature of 900–1000° F. in the presence of an inert gas containing at least about 20% by volume oxygen and 100 to 1000 p.p.m. water (mole basis) for a period of at least eight hours.

5. In a process for the catalytic reforming of hydrocarbons in the presence of hydrogen over a bed of platinum group metal catalyst, a method for regenerating the activity of said catalyst comprising the sequential steps:
   (1) during the normal operation of the process when the catalyst is at least partially deactivated by the accumulation of carbonaceous deposits and by the agglomeration of the platinum group metal into large crystallites of low activity, introducing chlorine and water into the hydrocarbon feed until the chlorine content of the catalyst is between about 0.3% by weight and equilibrium at the then operating conditions, the rate of chlorine addition being between about 20 p.p.m. and 200 p.p.m. by weight of the hydrocarbon feed and the mole ratio of $Cl_2$ to $H_2O$ being between about 0.0002 to 0.050, after which operation of the process is discontinued;

(2) removing at least a portion of the carbonaceous deposits from the catalysts by burning the deposits in the presence of an inert gas containing oxygen, the average temperature of the catalyst bed being maintained between 700 and 900° F.; and (3) maintaining the catalyst bed at a temperature of 900–1000° F. in the presence of an inert gas containing at least about 20% by volume oxygen and 300 to 750 p.p.m. water (mole basis) for a period of at least eight hours.

6. In a process for the catalytic reforming of hydrocarbons in the presence of hydrogen over a bed of platinum group metal catalyst, a method for regenerating the activity of said catalyst comprising the sequential steps:

(1) during the normal operation of the process when the catalyst is at least partially deactivated by the accumulation of carbonaceous deposits and by the agglomeration of the platinum group metal into large crystallites of low activity, introducing chlorine and water into the hydrocarbon feed until the chlorine content of the catalyst is between about 0.3 and 1.1% by weight, the rate of chlorine addition being between about 20 p.p.m. and 200 p.p.m. by weight of the hydrocarbon feed and the mole ratio of $Cl_2$ to $H_2O$ being between about 0.0002 to 0.050, after which operation the process is discontinued;

(2) removing at least a portion of the carbonaceous deposits from the catalyst by burning the deposits in the presence of an inert gas containing oxygen, the average temperature of the catalyst bed being maintained between 700 and 900° F.; and (3) maintaining the catalyst bed at a temperature of 900–1000° F. in the presence of an inert gas containing at least about 20% by volume oxygen and 300 to 750 p.p.m. water (mole basis) for a period of at least eight hours.

7. The process of claim 1 in which the oxygen for burning the carbon deposits is supplied by means of air.

8. The process of claim 1 in which the inert gas containing about 20% by volume oxygen is air.

9. The process of claim 6 in which the inert gas in step (3) contains about 500 p.p.m. water (mole basis).

References Cited by the Examiner
UNITED STATES PATENTS
3,117,076   1/1964   Brennan et al. _____ 208—140

DELBERT E. GANTZ, *Primary Examiner.*
H. LEVINE, *Assistant Examiner.*